US010281309B2

(12) United States Patent
Hou

(10) Patent No.: US 10,281,309 B2
(45) Date of Patent: May 7, 2019

(54) GAS FLOW METER

(71) Applicant: Yao-Sung Hou, Kaohsiung (TW)

(72) Inventor: Yao-Sung Hou, Kaohsiung (TW)

( * ) Notice: Subject to any disclaimer, the term of this patent is extended or adjusted under 35 U.S.C. 154(b) by 68 days.

(21) Appl. No.: 15/178,148

(22) Filed: Jun. 9, 2016

(65) Prior Publication Data
US 2017/0356776 A1   Dec. 14, 2017

(51) Int. Cl.
G01F 1/68 (2006.01)
G01F 1/696 (2006.01)
G01F 15/02 (2006.01)
G01F 15/04 (2006.01)
G01F 1/688 (2006.01)

(52) U.S. Cl.
CPC ............ G01F 1/696 (2013.01); G01F 1/6888 (2013.01); G01F 15/022 (2013.01); G01F 15/04 (2013.01); G01F 15/043 (2013.01)

(58) Field of Classification Search
CPC ........ G01F 1/696; G01F 15/022; G01F 15/04; G01F 1/6965
USPC ......................................... 73/204.19, 861.01
See application file for complete search history.

(56) References Cited

U.S. PATENT DOCUMENTS

| | | | | |
|---|---|---|---|---|
| 3,891,391 A | * | 6/1975 | Boone | G01F 1/68 73/204.18 |
| 3,898,638 A | * | 8/1975 | Deane et al. | G01F 1/684 340/599 |
| 6,672,154 B1 | * | 1/2004 | Yamagishi et al. | G01F 1/684 73/204.22 |
| 7,058,532 B1 | * | 6/2006 | Yamagishi et al. | G01F 1/684 702/100 |
| 2009/0000396 A1 | * | 1/2009 | Kawanishi et al. | G01F 1/684 73/861.95 |
| 2010/0147068 A1 | * | 6/2010 | Neuhaus et al. | G01F 1/68 73/204.11 |

* cited by examiner

*Primary Examiner* — Jewel V Dowtin
*Assistant Examiner* — Roger Hernandez-Prewit
(74) *Attorney, Agent, or Firm* — Muncy, Geissler, Olds & Lowe, P.C.

(57) ABSTRACT

A gas flow meter comprises a meter body, a tube, and a sensing unit. The sensing unit includes a base connected with one end of the tube; a speed transducer penetrating the base; a temperature transducer penetrating the base; a temperature compensator penetrating the base; and a microcontroller accommodated inside the meter body. The microcontroller is electrically connected with the speed transducer, the temperature transducer and the temperature compensator. The temperature transducer only functions to detect the temperature of the surrounding gas. The temperature compensator only functions to compensate the speed transducer for the temperature drop thereof. Each of them functions independently. Once the temperature of the speed transducer lowers, the temperature compensator directly compensates for the temperature drop, whereby the statistic error value is effectively decreased.

3 Claims, 3 Drawing Sheets

GAS FLOW METER

FIELD OF THE INVENTION

The present invention relates to a gas flow meter, particularly to a gas flow meter able to decrease statistic errors.

BACKGROUND OF THE INVENTION

Refer to FIG. 1 for a sensing unit 1 of a conventional gas flow meter. The sensing unit 1 is disposed in an accommodation space 20 of a tube 2 and used to measure the gas flow rate in an inner space 30 of a measured pipe 3. The sensing unit 1 includes a base 11 connected with one end of the tube 2, which is near the inner space 30 of the measured pipe 3; a speed transducing element 12 penetrating the base 11; and a temperature transducing element 13 penetrating the base 11. Two ends of the speed transducing element 12 are respectively disposed in the accommodation space 20 and the inner space 30 of the pipe 3. Two ends of the temperature transducing element 13 are respectively disposed in the accommodation space 20 and the inner space 30 of the pipe 3.

The temperature transducing element 13 is a multifunctional element including different control modes respectively to detect the ambient temperature and compensate for temperature variation. The internal processing unit of the temperature transducing element 13 has to switch the control mode to determine whether to detect the ambient temperature or compensate for the temperature drop of the speed transducing element 12. As the internal processing unit must spend time in switching the control mode, the temperature transducing element 13 cannot compensate for the temperature drop of the speed transducing element 12 instantly, which is the primary cause of errors.

The second cause of errors is that the microcontroller does not provide the compensated value flexibly according to the actual temperature variation. In general, a single compensated value is sufficient for the gases of the same composition and the gases with slight temperature variation.

For the gases of different compositions and the gases with greater temperature variation, a single compensated value set in the microcontroller is only available for the temperature variation between 0-30° C. Once the temperature variation is greater than 30° C., the single compensated value would cause errors in flow rate statistics. According to the results of practical statistics, the greater the temperature variation, the larger the statistic error value. Therefore, the conventional sensing unit still has room to improve.

SUMMARY OF THE INVENTION

One objective of the present invention is to provide a gas flow meter, wherein a temperature transducer and a temperature compensator respectively function independently to detect temperature and compensate for temperature drop, and wherein the temperature compensator can instantly compensate for temperature drop, whereby the statistic error value is effectively decreased.

To achieve the abovementioned objective, the present invention proposes a gas flow meter, which comprises a meter body, a tube and a sensing unit. The tube is connected with one end of the meter body and includes an accommodation space thereinside. The sensing unit includes a base connected with one end of the tube, which is far away from the meter body; a speed transducer penetrating the base; a temperature transducer penetrating the base; a temperature compensator penetrating the base; and a microcontroller accommodated inside the meter body. One end of the speed transducer protrudes from the base; another end of the speed transducer, which is far away from the base, is accommodated inside the accommodation space and electrically connected with the microcontroller. One end of the temperature transducer protrudes from the base; another end of the temperature transducer, which is far away from the base, is accommodated inside the accommodation space and electrically connected with the microcontroller. One end of the temperature compensator protrudes from the base1; another end of the temperature compensator, which is far away from the base, is accommodated inside the accommodation space and electrically connected with the microcontroller.

The present invention further divides the temperature compensation range, in which the microcontroller compensates the speed transducer, is divided into several heating sections each corresponding to a compensated value.

In one embodiment, each heating section is corresponding to a temperature range of 5° C., 10° C., 15° C., 20° C., 25° C., or 30° C.

The present invention is characterized in
1. The present invention respectively uses the temperature transducer and the temperature compensator to undertake temperature detection and temperature compensation. The temperature transducer only functions to detect the temperature of the surrounding gas. The temperature compensator only functions to compensate the speed transducer for the temperature drop thereof. In the present invention, the operations of temperature detection and temperature compensation are independent to each other. Each of them functions independently. Once the temperature of the speed transducer lowers, the temperature compensator directly compensates for the temperature drop, whereby the statistic error value is effectively decreased, and whereby is overcome the primary cause of errors in the conventional gas flow meter.
2. The present invention divides the temperature compensation range, in which the microcontroller compensates the speed transducer, is divided into several heating sections each corresponding to a compensated value, whereby the statistic error value is further decreased, and whereby is avoided the second cause of errors in the conventional gas flow meter.

DETAILED DESCRIPTION OF THE PREFERRED EMBODIMENTS

Below, the structure, assemblage, and application of the present invention will be described in detail in cooperation with the attached drawings to make easily understood the objectives, technical contents, characteristics and accomplishments of the present invention.

Figure 1:
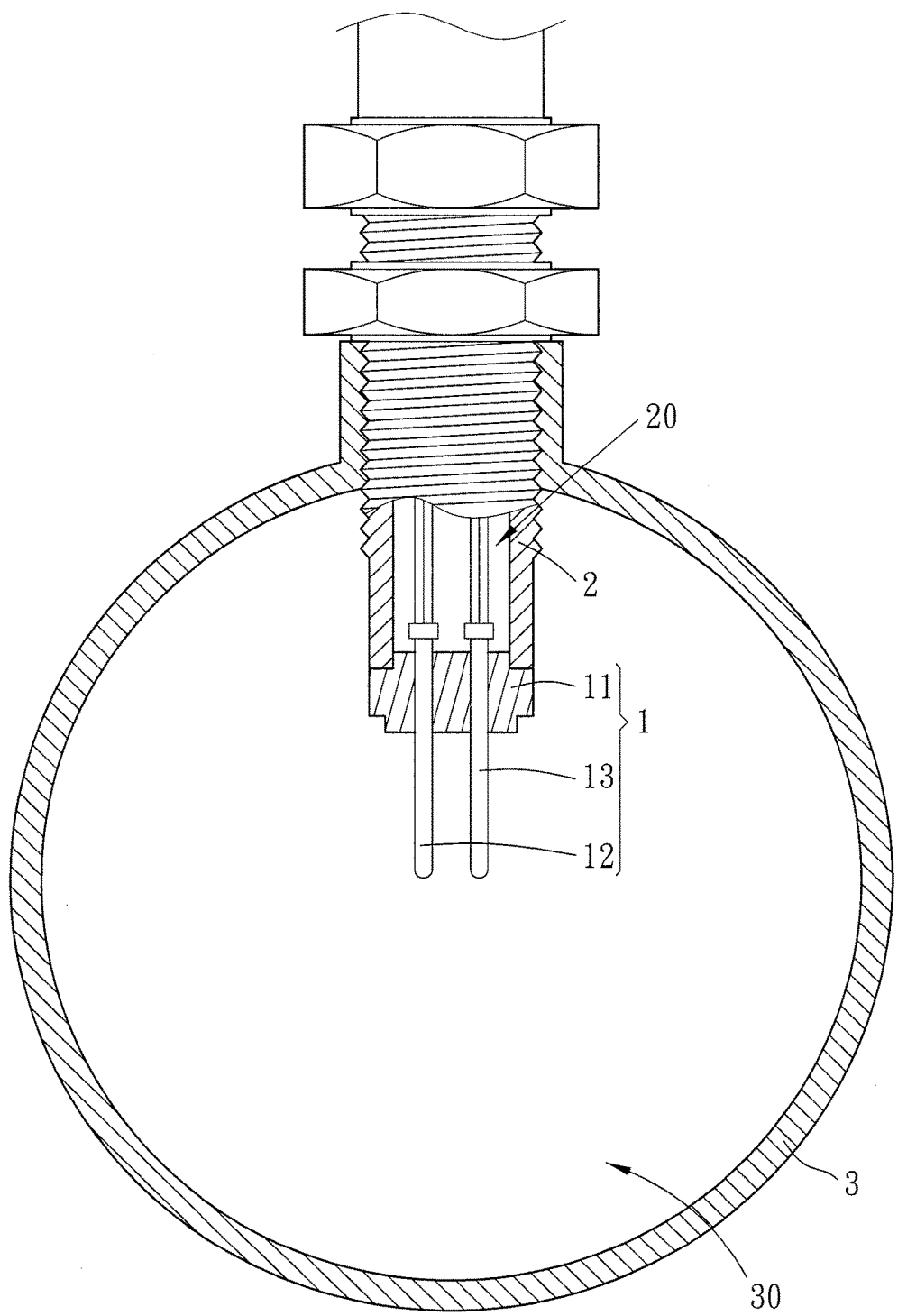
FIG. 1 is a sectional view schematically showing a conventional gas flow meter.
Figure 2:
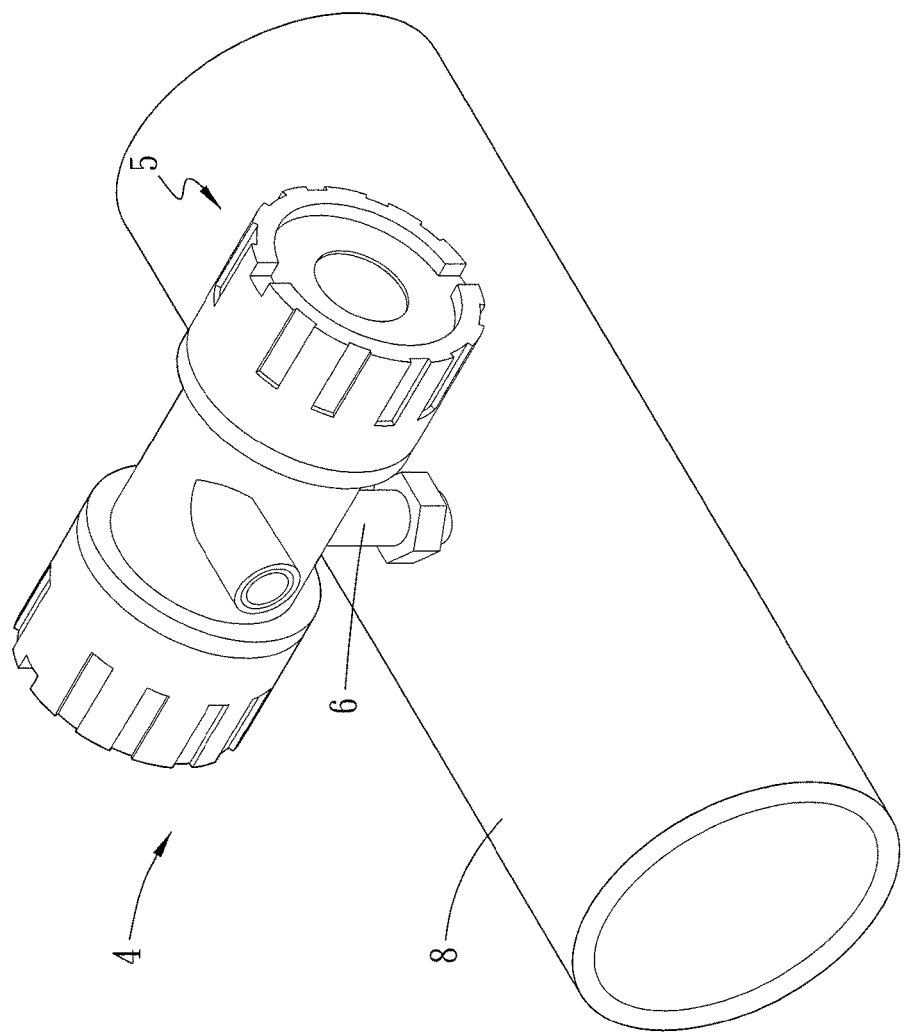
FIG. 2 is a perspective view schematically showing a gas flow meter according to one embodiment of the present invention.
Figure 3:
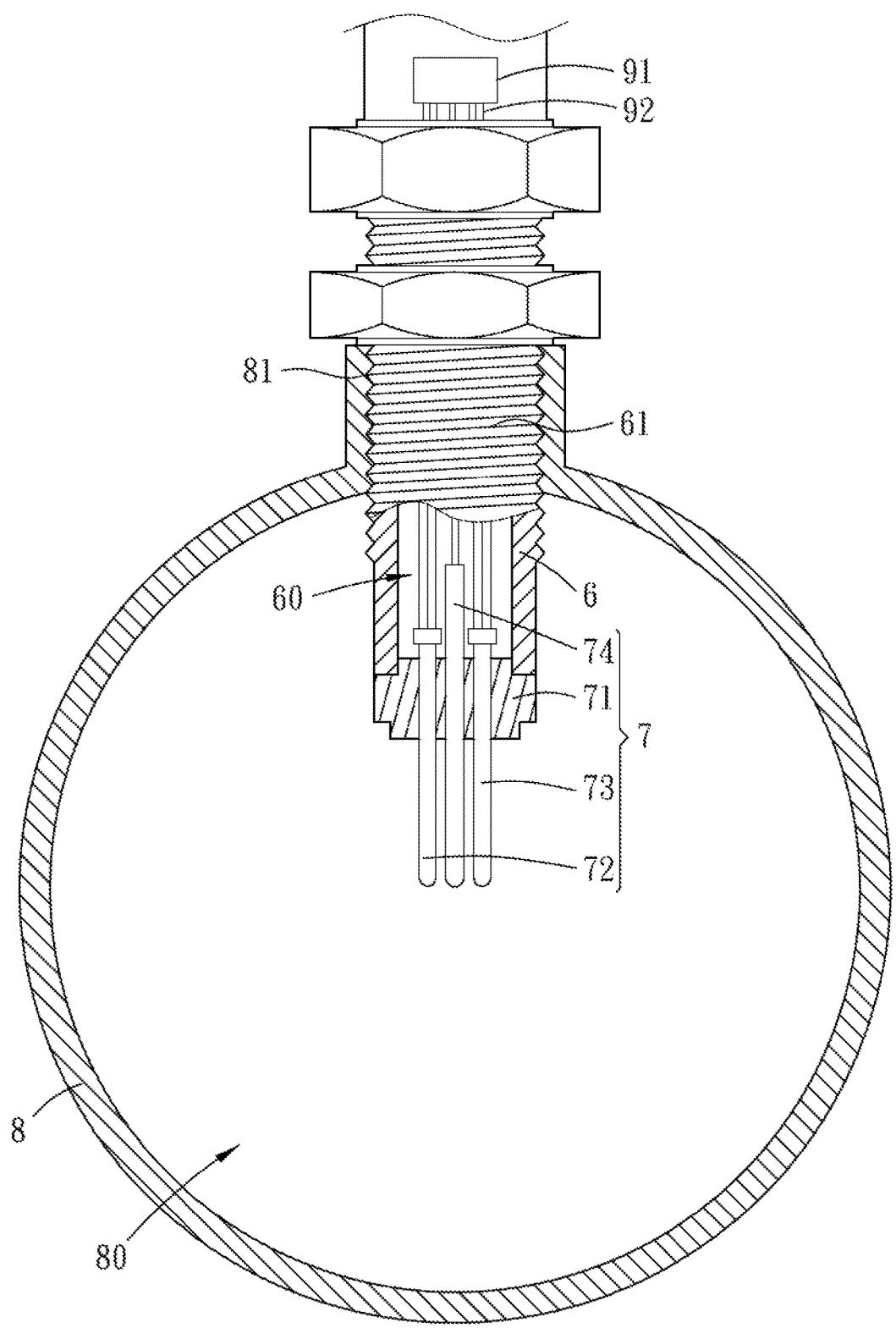
FIG. 3 is a sectional view schematically showing a gas flow meter according to one embodiment of the present invention.

Refer to FIG. 2 and FIG. 3. The present invention proposes a gas flow meter 4, which comprises a meter body 5, a tube 6, and a sensing unit 7. One end of the tube 6 is connected with the meter body 5, and another end of the tube 6 is extended into an inner space 80 of a measured pipe 8. The tube 6 includes an accommodation space 60 thereinside and an outer thread 61 on the outer surface thereof. The measured pipe 8 includes an inner thread 81 threadedly engaged with the outer thread 61, whereby the tube 6 can be screwed into and fixed to the measured pipe 8.

The sensing unit 7 includes a base 71 connected with one end of the tube 6, which is far away from the meter body 5; a speed transducer 72 penetrating the base 71; a temperature transducer 73 penetrating the base 71; a temperature compensator 74 penetrating the base 71; and a microcontroller 91 accommodated inside the meter body 5. One end of the speed transducer 72 protrudes from the base 71 and is accommodated inside the inner space 80; another end of the speed transducer 72, which is far away from the base 71, is accommodated inside the accommodation space 60 and electrically connected with the microcontroller 91. One end of the temperature transducer 73 protrudes from the base 71 and is accommodated inside the inner space 80; another end of the temperature transducer 73, which is far away from the base 71, is accommodated inside the accommodation space 60 and electrically connected with the microcontroller 91. One end of the temperature compensator 74 protrudes from the base 71 and is accommodated inside the inner space 80; another end of the temperature compensator 74, which is far away from the base 71, is accommodated inside the accommodation space 60 and electrically connected with the microcontroller 91. The microcontroller 91 is electrically connected with the speed transducer 72, the temperature transducer 73 and the temperature compensator 74 through wires 92.

The microcontroller 91 controls the temperature transducer 73 to detect the temperature of the surrounding gas. The microcontroller 91 heats the speed transducer 72. The temperature compensator 74 compensates the speed transducer 72 for the temperature drop thereof through the microcontroller 91. The present invention is distinct from the conventional technical measure in that the speed transducer 72, the temperature transducer 73 and the temperature compensator 74 operate independently. In other words, the microcontroller 91 needn't switch the control mode to enable the temperature transducer 73 to detect the temperature of the surrounding gas or trigger the temperature compensator 74 to compensate for the temperature drop of the speed transducer 72.

In the present invention, temperature detection and temperature compensation are respectively controlled by the temperature transducer 73 and the temperature compensator 74. The temperature transducer 73 only functions to detect the temperature of the surrounding gas. The temperature compensator 74 only functions to compensate the speed transducer 72 for the temperature drop thereof. In the present invention, the operations of temperature detection and temperature compensation are independent to each other. Once the temperature of the speed transducer 72 lowers, the temperature compensator 74 directly compensates for the temperature drop, whereby the statistic error value is effectively decreased. Therefore, the present invention can overcome the primary cause of errors in the conventional gas flow meter.

Besides, the temperature compensation range, in which the microcontroller 91 compensates the speed transducer 72, is divided into several heating sections each corresponding to a compensated value, whereby the statistic error value is further decreased, and whereby is avoid the second cause of errors in the conventional gas flow meter.

For example, while the temperature variation is within 0-20° C., the microcontroller 91 heats the speed transducer 72 by a first compensated value; while the temperature variation is within 21-40° C., the microcontroller 91 heats the speed transducer 72 by a second compensated value; while the temperature variation is within 41-60° C., the microcontroller 91 heats the speed transducer 72 by a third compensated value, and so on. Via the functional temperature compensation to the speed transducer 72, the statistic error value is further decreased. In the above embodiment, each heating section is corresponding to a temperature range of 20° C. However, the present invention is not limited by the above embodiment. In the present invention, each heating section may be corresponding to a temperature range of 5° C., 10° C., 15° C., 25° C., or 30° C.

In conclusion, the present invention respectively uses the temperature transducer 73 and the temperature compensator 74 to undertake temperature detection and temperature compensation. The temperature transducer 73 only functions to detect the temperature of the surrounding gas. The temperature compensator 74 only functions to compensate the speed transducer 72 for the temperature drop thereof. In the present invention, the operations of temperature detection and temperature compensation are independent to each other. Once the temperature of the speed transducer 72 lowers, the temperature compensator 74 directly compensates for the temperature drop, whereby the statistic error value is effectively decreased. In one embodiment, the present invention divides the temperature compensation range, in which the microcontroller 91 compensates the speed transducer 72, into several heating sections each corresponding to a compensated value, whereby the statistic error value is further decreased.

What is claimed is:

1. A gas flow meter comprising
   a meter body;
   a tube connected with one end of the meter body and including an accommodation space thereinside; and
   a sensing unit including a base connected with one end of the tube, which is far away from the meter body; a speed transducer penetrating the base; a temperature transducer penetrating the base; a temperature compensator penetrating the base; and a microcontroller accommodated inside the meter body,
   wherein one end of the speed transducer protrudes from the base; another end of the speed transducer, which is far away from the base, is accommodated inside the accommodation space and electrically connected with the microcontroller, and the speed transducer acquires a gas flow value based on the heat which is taken away by a gas incoming the tube, and the speed transducer is maintained in a preset temperature which is controlled by the microcontroller;
   wherein one end of the temperature transducer protrudes from the base; another end of the temperature transducer, which is far away from the base, is accommodated inside the accommodation space and electrically connected with the microcontroller, and the temperature transducer detects a temperature of the gas around the speed transducer and transmits to the microcontroller; and
   wherein one end of the temperature compensator protrudes from the base; another end of the temperature compensator, which is far away from the base, is accommodated inside the accommodation space and electrically connected with the microcontroller, and the temperature compensator performs a temperature compensation on the gas flow value to acquire an accurate gas flow according to difference between the preset temperature and the temperature of the gas provided by the microcontroller; and wherein the speed transducer, the temperature transducer and the temperature compensator are operated separately.

2. The gas flow meter according to claim 1, wherein a temperature compensation range, in which the microcontroller compensates the speed transducer, is divided into several heating sections each corresponding to a compensated value.

3. The gas flow meter according to claim 2, wherein each heating section is corresponding to a temperature range of 5° C., 10° C., 15° C., 20° C., 25° C., or 30° C.

* * * * *